United States Patent [19]

Toups

[11] 4,318,327
[45] Mar. 9, 1982

[54] DIGITAL CHORD DISPLAY FOR STRINGED MUSICAL INSTRUMENTS

[76] Inventor: Daniel J. Toups, 201 Estate Dr., Houma, La. 70360

[21] Appl. No.: 167,241

[22] Filed: Jul. 10, 1980

[51] Int. Cl.³ .............................................. G09B 15/02
[52] U.S. Cl. ................................... 84/477 R; 84/267
[58] Field of Search .................... 84/1.16, 267, 470 R, 84/477 R, 478, DIG. 30

[56] References Cited

U.S. PATENT DOCUMENTS

| | | | |
|---|---|---|---|
| 3,482,029 | 12/1969 | Sines | 84/1.16 |
| 3,530,226 | 9/1970 | Wheeler et al. | 84/DIG. 30 |
| 3,530,227 | 9/1970 | Wheeler et al. | 84/DIG. 30 |
| 3,744,368 | 7/1973 | Lady | 84/470 R |
| 3,823,637 | 7/1974 | Scott | 84/470 R |
| 4,054,868 | 10/1977 | Rose | 84/478 X |
| 4,080,867 | 3/1978 | Ratanangsu | 84/477 R |

*Primary Examiner*—S. J. Witkowski
*Attorney, Agent, or Firm*—James F. Cottone

[57] ABSTRACT

A multimode digital display assembly is configured to provide a real time alphanumeric display of notes and chords being played on stringed musical instruments, such as a guitar, as a learning or teaching aid. The display assembly is particularly well adapted to be retrofitted to a minimally modified guitar, and the display generating circuitry is specially selected for a low cost/low complexity implementation. Basic operating modes provide both a track, and latch display type, and an alternate operating mode uses sound produced by the instrument to initiate and update displays of the notes and chords being played.

9 Claims, 4 Drawing Figures

DIGITAL CHORD DISPLAY FOR STRINGED MUSICAL INSTRUMENTS

BACKGROUND OF THE INVENTION

1. Field of the Invention

The present invention relates generally to electronic means for displaying notes and chords played on stringed instruments, and in particular to a digital display device configured to be attached to existing musical instruments, such as guitars, to provide an alphanumeric display of the particular chords being played.

2. Description of the Prior Art

Devices and techniques used as aids for teaching of playing musical instruments are, of course, well known and have a long history of development. Known devices range from the basic metronome up to the fairly complex instructor/student interactive electronic consoles; and teaching methods are as diverse and as rich as the number of people using them. An illustrative approach in the prior art is outlined in U.S. Pat. No. 3,744,368 to Lady, which discloses the use of an instructor/student comparison device for imparting musical skill. In 3,744,368, the instructor depresses selected keys on a large, somewhat conventional keyboard, and one or more students respond by attempting to execute identical key patterns. Both audible and visual cues and fault indications are used to monitor the calibre of the resulting interactions. U.S. Pat. No. 3,823,637 to Scott discloses an audio-visual music educational device directed to teaching and testing students with regard to comprehension of standard musical notation. U.S. Pat. No. 4,054,868 to W. J. Rose provides a recent and substantive teaching of a largely digital device for displaying musical scales and chords in response to actuations of pushbuttons on a portable, hand-held device. Functionally, the device responds to manipulations of the user-actuated pushbuttons to fetch from self-contained electronic storage means, signals representative of the selected quantities. The display contains letter representations of musical notes, including sharps and flats designations where appropriate. Additional teachings of electronic devices interacting with stringed instruments are provided in U.S. Pat. Nos. 3,530,227 and 3,530,226, both to Wheeler et al, and in U.S. Pat. No. 3,482,029 to Sines.

SUMMARY OF THE INVENTION

It is therefore a primary object of this invention to provide improved apparatus for displaying the notes and chords on stringed musical instruments.

A further object of this invention is to provide direct reading display apparatus for producing a real time, alphanumeric display of notes and chords being fingered and played on a stringed instrument.

Another object of this invention is to provide a portable, multimode alphanumeric display capable of being retrofitted readily onto an existing stringed instrument.

Yet another object of this invention is to provide a portable alphanumeric display device for displaying notes and chords for real time viewing by a student instrument player as a learning aid for chord fingering.

A further object of this invention is to provide a multimode alphanumeric display capable of driving a larger sized display device which may be visually monitored by an instructor some distance away from the student playing the instrument.

A still further object of this invention is to provide an alphanumeric chord display device for stringed instruments wherein the display produced is conditioned upon detection of sound produced by the instrument.

In a preferred embodiment of the present invention, a conventional stringed instrument is adapted to provide string/fret position status to fully automatic electronic circuitry which polls the intersections of a matrix formed from the string/fret positions, and produces a direct reading display of the notes and chords fingered on the instrument. The circuitry is controlled by an integrated digital logic unit and provides a number of display modes, including a mode wherein the sound produced by the instrument is used to initiate an update of the notes and chords being displayed.

BRIEF DESCRIPTION OF THE DRAWINGS

Additional objects and advantages of the invention will become apparent to those skilled in the art as the description proceeds with reference to the accompanying drawings wherein.

DETAILED DESCRIPTION OF THE PREFERRED EMBODIMENTS

Figure 1:
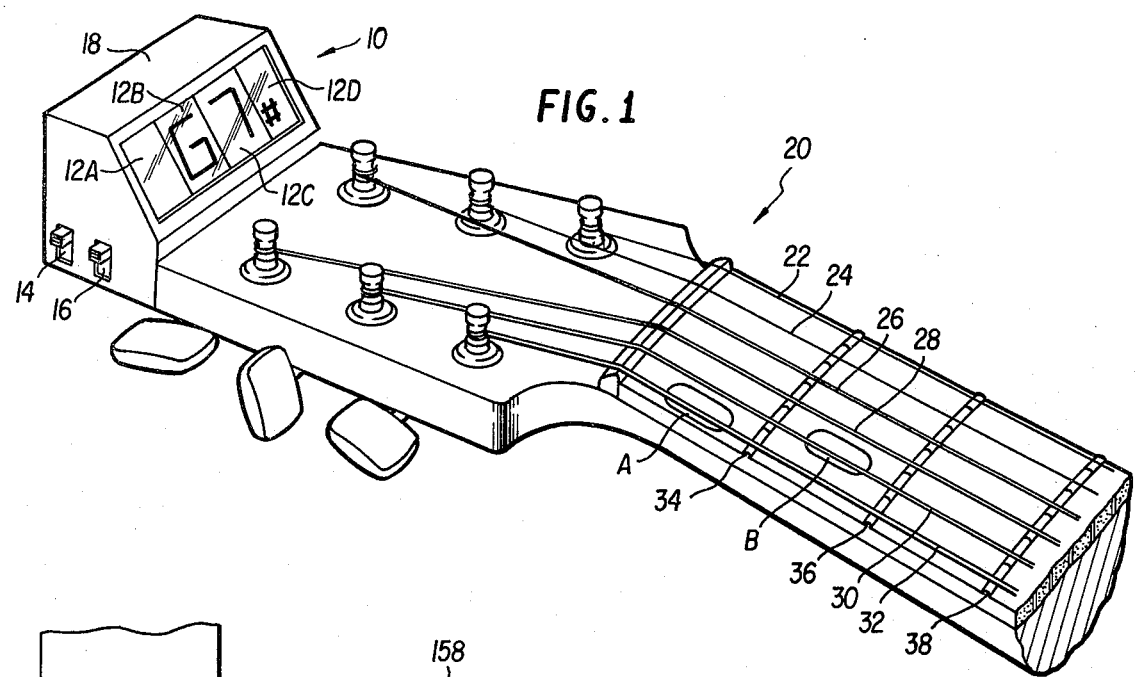
FIG. 1 is a sectional view of a stringed instrument including the digital display assembly according to the present invention.

Referring now to FIG. 1, there is shown a sectional view of a stringed instrument including the digital display assembly according to the present invention. While the description presented herein is set forth specifically in terms of a six-stringed guitar, it is clear that a very wide range of stringed instruments are within the purview of the present description. A display assembly 10 is shown as having four alphanumeric display elements 12A, 12B, 12C and 12D, and a pair of control switches 14 and 16, all of which are integrally formed into a display housing 18. The display assembly 10 is plugged into a guitar 20 via a multiple pin connector (not shown) and the guitar 20 has the conventional six strings designated 22, 24, 26, 28, 30 and 32; as well as a number of frets designated as 34, 36, 38, and so forth. For ease of description hereinafter, the six strings and several frets are considered as defining an M×N matrix (M=the number of strings, six illustratively; and N=the number of frets, three or more) wherein the intersection of each string and each fret defines a position which is fingered by the instrument player in the process of evoking the desired chords. Actually, the position of the intersection within the M×N matrix is established by considering as the fret location the region slightly shifted along the keyboard from its related fret. Thus, the position "A" shown is considered as the matrix intersection point associated with the string 32 and the fret 34; and position "B" shown is considered as the matrix intersection associated with the string 30 and the fret 36, and so forth. An alternate designation for these positions such as "A" and "B", and the like, will be termed interfret positions, which positions also conform to the above positional definition. Each intersection point thus defined on the instrument 20 must be monitored by the display-generating circuits, and therefore the intersection must provide a status indication which may be uniquely sensed. In a simplified embodiment, an M×N switching matrix may be implemented by using electrically conductive strings (for the longitudinal direction), and conductive strips mounted flush between the frets (in the transverse direction) in the neck of the instrument 20. The frets are of a non conductive material, and upon applying finger pressure to any string between any two frets, a unique electrical circuit connection is produced. A preferred alternate embodiment for use with instruments having non conductive strings would be comprised of an M×N array of membrane switches positioned beneath the strings and between the frets. These switches, each a single-pole-single-throw device, are then wired into a matrix configuration to provide the desired unique intersection status monitoring means. For compactness of notation, this M×N matrix mounted integrally with the instrument neck will hereafter be designated the string/fret switching matrix regardless of the particular configuration it may assume, and the M string connections and N fret connections are routed via the multiple pin connector mentioned above. In use, the display assembly 10 is affixed to an appropriately modified guitar, and the control switches 14 and 16 are set by the instrument player for the desired operating modes. As will be described below, the control switch 14 selects the type of display (track, or hold) to be presented, while the control switch 16 selects the type of interaction (practice, or play) between the sound produced by the instrument 20 and the display-generating circuits within the display assembly 10. Thus, the composite display assembly 10/guitar 20 combine to yield a conventionally playable guitar having a real time digital display of the chords played, and includes a number of operating modes to condition the particular type of chord display to be presented.

Figure 2:
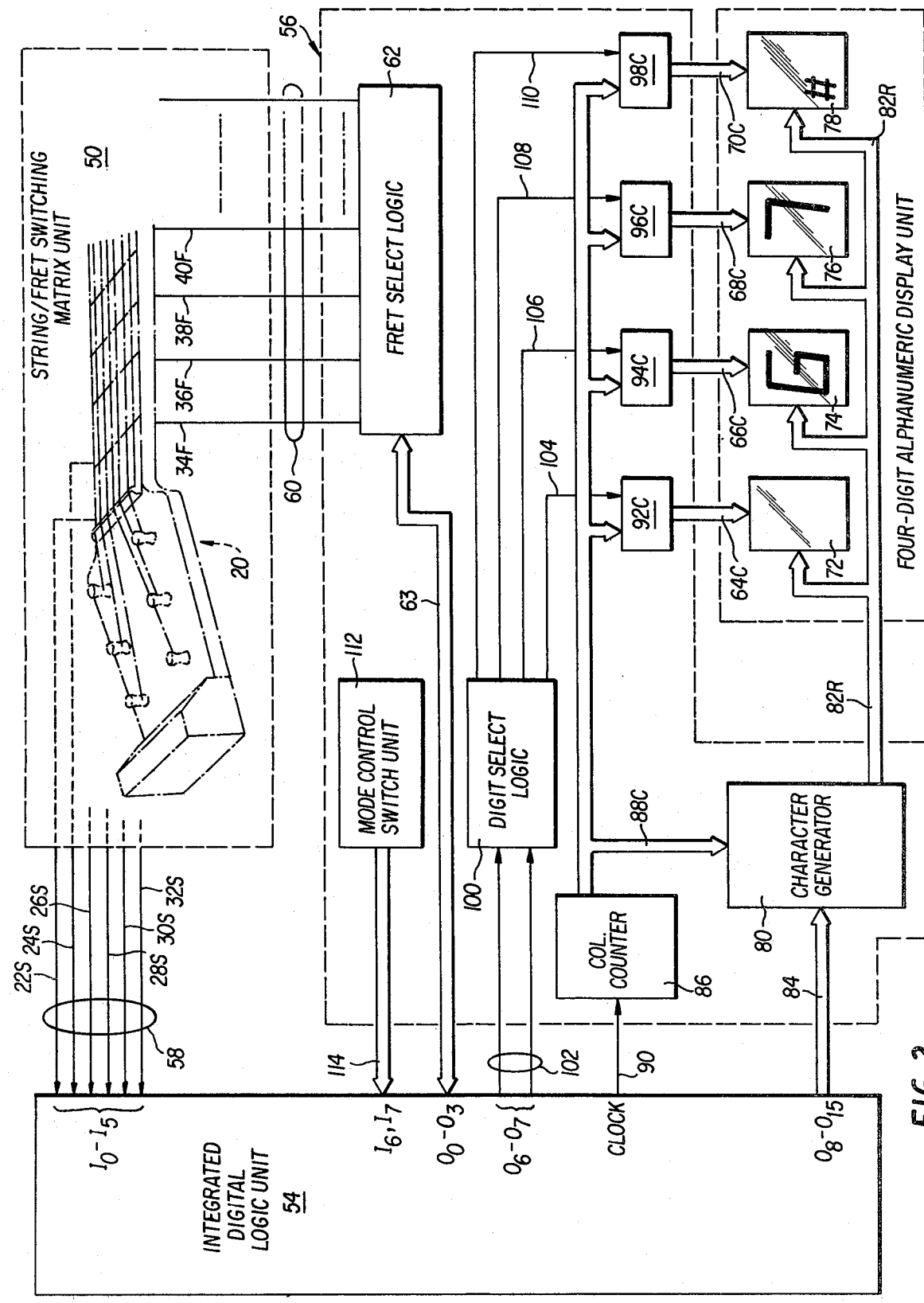
FIG. 2 is an overall block diagram of the circuitry used to implement the digital chord display.

Turning now to FIG. 2, there is shown an overall block diagram of the circuitry used to implement the digital chord display. By way of a brief overview, the circuitry employs an integrated digital logic unit to detect which matrix positions on the instrument have been fingered, and to develop the output signals for actuating the digital display. Additionally, the integrated digital logic unit carries out other perfunctory tasks such as monitoring the status of the control switches 14 and 16, and sequencing the display output signals, and so forth. In broad terms, the circuitry is comprised of a string/fret switching matrix unit 50, affixed to the stringed instrument 20; a four-digit alphanumeric display display unit 52; an integrated digital logic unit 54 (hereinafter the integrated logic unit 54); and auxiliary circuit 56. A first group of interconnections with the switching matrix 50, each of which corresponds to one of the six strings, are routed via a group of lines 58 to a first input area of the integrated logic unit 54. This group of interconnections bear the designations 22S, 24S, 26S, 28S, 30S and 32S indicating their correspondence to the six like-numbered strings of FIG. 1. A second group of interconnections with the switching matrix 50, each of which corresponds to a fret of the instrument 20, is routed via a group of lines 60 to a fret select logic 62 located within the auxiliary circuit 56. This second group of interconnections bear the designations 34F, 36F, 38F, and 40F indicating their correspondence to like-numbered frets of FIG. 1, and while only four fret interconnections are shown, this number can, of course, be expanded to suite the needs of the instrument in actual use. The fret select logic 62 is interconnected with the integrated logic unit via a group of lines 63. The auxiliary circuit 56 provides a first set of display logic select signals via logic trunks 64C, 66C, 68C, and 70C to the display unit 52. These four logic trunks provide column select signals to four digital display elements 72, 74, 76, and 78 within the display unit 52, each of which is capable of producing a complete alphanumeric character, using a 7×9 dot matrix, when properly energized. Each logic trunk is associated with a particular one of the four display elements shown. A second set of display logic signals are routed from a character generator 80 located within the auxiliary circuit 56, via a row logic trunk 82R to each of the four display elements 72, 74, 76 and 78. Thus, the display elements 72, 74, 76 and 78 which may, illustratively, be of the type bearing the commercial designation MAN-3 (from the Monsanto Corporation) are provided with both row and column select signals via the individual column logic trunks 64C-70C, and the single row logic trunk 82R. The character generator 80 is in turn provided a set of input signals which originate in the integrated logic unit 54 via a group of lines 84. Another set of signals which are developed in a column counter 86, located in the auxiliary circuit 56, are routed via a group of lines 88C as a secondary set of input signals to the character generator 80. The column counter 86 is driven by a clock signal provided from the integrated logic unit 54 via a line 90. The group of lines 88C are further routed to four column select logic circuits 92C, 94C, 96C and 98C, each of which is associated with a particular one of the four display elements shown. A display digit select logic 100, also located within the auxiliary circuit 56, has as its input a pair of control signals developed within the integrated logic unit 54 and applied via a group of lines 102. Four separate output signals, routed from the digit select logic 100 via lines 104, 106, 108 and 110, are applied as digit select signals, respectively, to each of the four column select logic circuits, as shown. A number of instrument player-actuated control switches, including control switches 14 and 16 of FIG. 1, are shown as located within a mode control switch unit 112, which provides switch status signals to the integrated logic unit 54 via a group of lines 114.

With continued reference to FIG. 2, primary and alternate operating modes of the chord display-generating circuits will now be described. Functionally, the principal task of the circuitry shown is to detect which particular string/fret combinations have been actuated by the instrument player, and to convert these actuations into an alphanumeric display of the corresponding chord. Several distinct modes are implemented to accomplish the desired displays.

In a basic operating mode, the switching matrix unit 50 is rapidly scanned through one complete scan cycle to develop near simultaneous information on the condition (depressed/unactuated) of each matrix intersection point. On the basis of a complete scan cycle, the integrated logic unit 54 develops output signals corresponding to the desired chord display via a table look-up technique, and the auxiliary circuit 56 conditions these output signals into row and column signals suitable for energizing the direct reading alphanumeric display unit 52. As an example of a read only memory (ROM) technique for developing such a conversion of of matrix intersections to chord output signals, the interested reader is referred to the tables disclosed in the aforementioned U.S. Pat. No. 4,054,868 to Rose.

The switching matrix 50 is scanned by the integrated logic unit 54 and the fret select logic 62 as follows. The integrated logic unit 54 first directs the fret select logic 62 via the lines 63 to energize one of the lines 34F, 36F, 38F and 40F (and others, as implemented) which are connected to the switching matrix 50 (transverse array) on the instrument 20. The integrated logic unit 54 then cyclically reads each of the strings (longitudinal array) via the lines 58, to determine which strings are being depressed at the selected fret location. This process is cyclically repeated for each of the lines 34F, 36F, 38F and 40F (and others) until all fret locations covered by the switching matrix 50 have been scanned. Completion of this cycle constitutes a complete scan cycle of the instrument 20, and the information derived is used to generate a chord display.

The display portion of the circuit is comprised of the four 7×9 dot matrix display elements 72, 74, 76 and 78; column select logic 92C, 94C, 96C and 98C; column counter 86; digit select logic 100; and character generator 80; all of which function under the control of the integrated logic unit 54. With information as developed via the scanning process, the integrated logic unit 54 generates an appropriate chord display as follows.

On completion of a scan cycle, the integrated logic unit 54 directs the digit select logic 100, via the lines 102, to select one of the display elements 72, 74, 76 and 78 via an associated line from among the lines 104, 106, 108 and 110. Upon selecting the desired display element, the ASCII code (illustratively) for the appropriate character to be displayed is outputted from the integrated logic unit 54 via the lines 84 to the character generator 80. The character generator 80 converts the ASCII code into the necessary bit pattern to display the desired character on the selected display element. Considering typical limitations of low cost, commercially available character generators, the devices can only output the bit pattern of one column of the 7×9 display element at a time. Therefore, column information is provided by column counter 86 via the lines 88C to character generator 80, and the column elect logic 92C, 94C, 96C and 98C. The column counter 86 is driven by a clock signal developed within the integrated logic unit 54, which free runs at a rate sufficiently high that a sequential display of all columns appears simultaneous. This entire character generating process is repeated for each of the four display elements 72, 74, 76 and 78, or for as many elements as are needed to display the desired chord. Thereupon, the above described scanning process of the instrument 20 is again carried out, and an updating of the resulting chord display is generated and displayed. As is well known in the electronic display art, updating rates, and retention of the last valid display, and so forth, are features which receive full consideration during the design process such that the display ultimately presented to the observer is both of high utility and free of undesired transient effects.

Control switch 14 is used to select which of two basic display modes is to be used. In a first position, the control switch 14 enables a "latch" display mode wherein the display elements 72, 74, 76 and 78 retain the most recent valid chord or note fingered. Thus, the display elements are updated only upon recognition by the integrated logic unit 54 that a particular chord, which it has internally stored, has been detected by the scanning process, and that a different chord was previously being displayed. In a second position the control switch 14 enables a "track" display mode. In this mode, the display portion of the circuit is updated after each scanning sequence, and the display elements reflect the condition of the string/fret matrix 50, for each scan cycle. An adjustably short time delay may be incorporated into the track mode display to automatically reset the display elements 72, 74, 76 and 78 to all zeros after initiation of each particular chord display.

In an alternate embodiment, the display assembly uses the sound developed by the instrument 20 to condition the display being presented. As selected by the control switch 16, both a "practice" and a "play" mode may be chosen by the instrument player. Briefly, in the practice mode, the display elements 72, 74, 76 and 78 always shows the current fingering as outlined in the track mode above. In the play mode, the switching matrix 50 is only scanned when one or more strings have been picked. Thus, the chord is not displayed until an enabling signal is provided via sound produced by the string(s).

Figure 3:
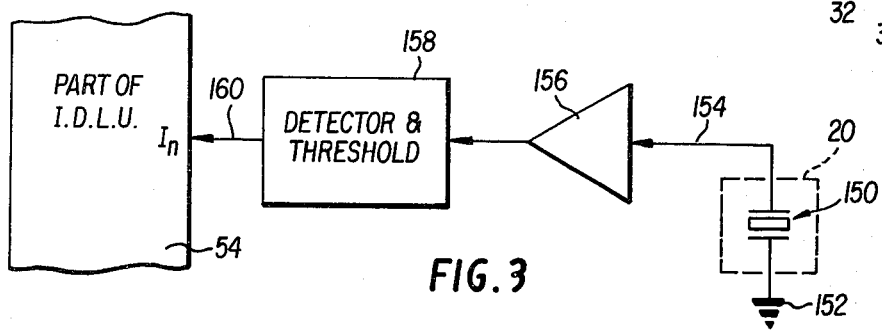
FIG. 3 is a simplified block diagram showing an alternate embodiment using sound input means to condition the chord display generated.

Referring now to FIG. 3, an overall block diagram shows the input means used to implement this sound actuated play mode. An acoustoelectric transducer, shown illustratively as a crystal microphone 150, is mounted in the sound hole of the instrument 20 and detects the sound produced by any strings picked. The microphone 150 is shown as referenced to a suitable ground point 152. The instrument sound is converted into corresponding signals which are applied to an amplifier 156 via a path 154. After amplification and pass band shaping in the amplifier 156, the conditioned signal is routed to a combination detector and thresholding circuit 158. The output from this circuit 158, having been processed to produce highly valid signals at digital logic levels is then applied via a path 60 to an available input area of the integrated logic unit 54, designated generally as the $I_n$ input. The integrated logic unit 54 then uses the presence of appropriate logic levels at its $I_n$ input to initiate a scanning cycle of the switching matrix 50, and the resulting sensed intersection status conditions are used, as before, to derive and produce the desired chord display. The chord display thus produced is retained until a subsequent chord is played, whereupon the display updating is done nearly instantaneously—the scan and refresh cycles requiring time on the order of a few milliseconds.

Figure 4:
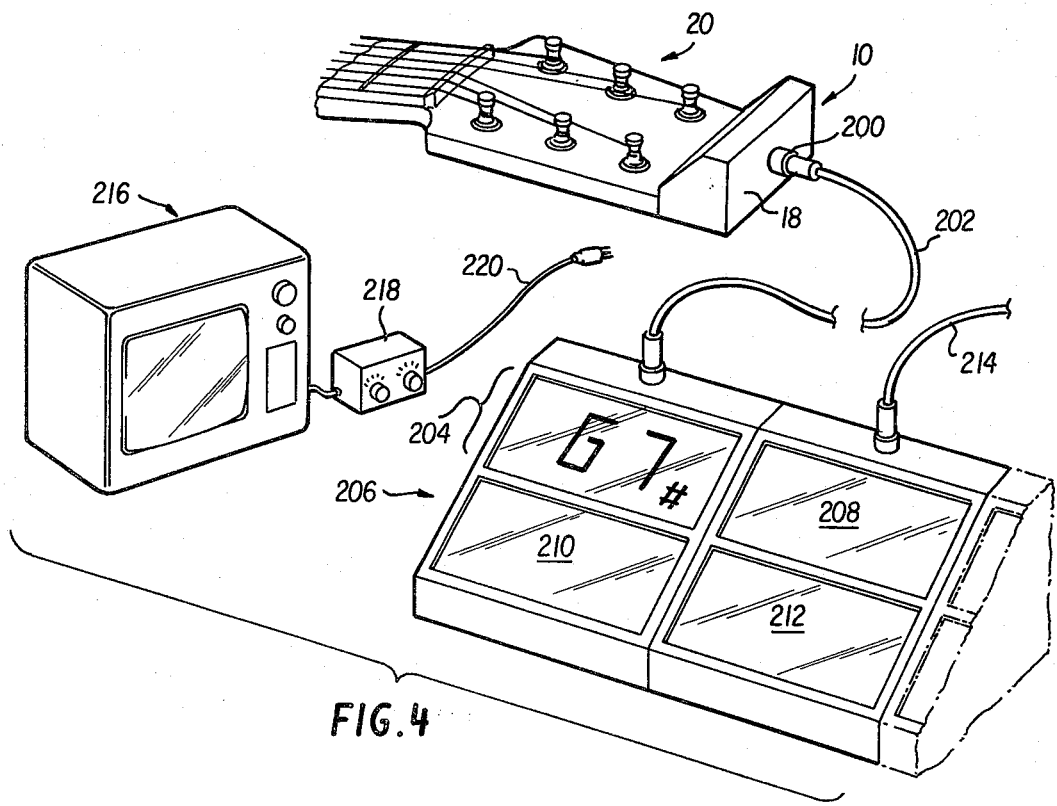
FIG. 4 is a pictorial diagram of a student/instructor configuration of the display apparatus.

Referring now to FIG. 4, there is shown a further modification of the display assembly 10 adapted for use in an instructor/student configuration. The instrument 20 is fitted out with a display assembly 10, and includes the string/fret switching matrix unit 50 (not shown), as before. Operation of the display circuitry within this version is substantially the same as previously described in connection with FIG. 2. The display housing is fitted with a display output connector 200 into which is plugged a remote display cable 202. The remote cable 202 is applied to an input of a large-sized, multiple digit alphanumeric display 204, which is part of an instructor's display console 206. The instructor's display console may also contain a number of other remote alphanumeric displays 208, 210, 212, and so forth; each of which would be driven via corresponding remote display cables, such as the cable 214, from its associated basic chord display assembly.

Functionally, each remote alphanumeric display such as the remote display 204 is comprised of substantially the same four display elements 72, 74, 76 and 78 as described previously. The remote display elements are merely scaled up in size, and include whatever additional amplification (or other amplitude scale factor compensation) is required for driving the larger display elements. The signals required for driving any remote displays are taken as extensions from the signals provided on the column logic trunks 64C, 66C, 68C and 70C, and the row logic trunk 82R, both as shown in FIG. 2. While the display assembly 10 is envisioned as being highly portable and therefore battery powered, the instructor's console is AC powered, and hence the display brightness and viewing angle is established for optimum viewing at a distance without the need for any display constraints imposed by power usage. In this regard, a commercial television receiver such as the set 216, may also serve as a convenient means for producing a large-sized, alternate remote display medium. The television 216 is connected via a scan converter 218 and a remote display cable 220 into the display output connector 200, as with the instructor's console 206. In this case a conventional scan converter 218 is required to convert the 7×9 dot matrix signals into suitable field/frame format for use with a conventional NTSC 525 television display. Operationally, this enlargened display capability adds a powerful new operating mode to the chord display apparatus. It is used, for example, to assist an instructor in monitoring a small group of students in real time by clearly indicating which student(s) is properly actuating the desired chords. Additionally, the instructor's display serves as a valuable troubleshooting aid as the instructor could observe not only the chord being attempted by each student, but also the fingering sequence being used—via a track mode display. As a further learning aid, a beginning student could observe his own progress on the large television display, for example, and the direct and positive alphanumeric readout serves to reinforce the tactile and audible responses being evoked from the instrument.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

What is claimed is:

1. A display device for use with a stringed instrument having depressible strings and interfret positions comprising:
   (a) a switching matrix adapted for connection to said instrument for providing status signals indicative of the state of each string for every interfret position;
   (b) a plurality of display elements for displaying musical chord indicia corresponding to the status signals produced in said switching matrix;
   (c) a digital logic circuit connected to said switching matrix and to said display elements comprising:
      (i) fret scanning means for successively accessing each interfret position of said instrument, and string scanning means for individually monitoring all strings of said instrument during each of said successive interfret position accessions;
      (ii) electronic storage means addressable by predetermined combinations of said status signals and containing information signals corresponding to musical chord indicia representative of said predetermined combinations;
      (iii) a digit, row and column select circuit for cyclically accessing each of said display elements; and
      (iv) output sequencing means for directing said information signals to said display elements in synchronism with said digit, row and column select circuit.

2. The display device of claim 1 wherein said switching matrix comprises a first plurality of output lines corresponding to the number of strings of said instrument, and a second plurality of output lines corresponding to the number of interfret positions of said instrument.

3. The display device of claim 2 wherein said first and second plurality of output lines does not exceed in number the sum of the number of strings in use on said instrument plus the number of interfret positions fitted to said instrument.

4. The display device of claim 3 further comprising remote display means connected to said digit, row and column select circuit and to said output sequencing means for providing a remote display of said musical chord indicia corresponding to said information signals.

5. A display device for use with a stringed musical instrument having interfret positions, comprising:
   (a) a switching matrix adapted to be fitted to said instrument and having a first plurality of output lines corresponding to the number of strings and a second plurality of output lines corresponding to the number of frets of said instrument for providing string/fret status signals indicative of the state of each string for every interfret position;
   (b) display means having a plurality of display elements for displaying musical indicia corresponding to said string/fret status signals;
   (c) a digital logic circuit connected to said switching matrix and to said display means comprising:
      (i) fret scanning means connected to said second plurality of matrix output lines for successively selecting each interfret position of said instrument and string scanning means connected to said first plurality of matrix output lines for individually sampling all strings of said instrument during each of said successive interfret position selections;
      (ii) electronic storage means addressable by predetermined combinations of said string/fret status signals and containing information signals corresponding to musical indicia representative of said predetermined combinations;
      (iii) a display element select circuit for cyclically accessing each of said display elements;
      (iv) output sequence means for directing said information signals to said display means in synchronism with said display element select circuit; and
   (d) electroacoustic transducer means acoustically coupled to said instrument and connected to said digital logic circuit for initiating the action of said scanning means on sensing a predetermined sonic output from said instrument.

6. The display device of claim 5 wherein said first and second plurality of output lines do not exceed in number the sum of the number of strings in use on said instrument plus the number of interfret positions fitted to said instrument.

7. The display device of claim 5 further comprising remote display means connected to said display element select circuit and to said output sequence means for providing a remote display of musical indicia corresponding to said string/fret status signals.

8. The display device of claim 5 wherein said display elements are dot matrix pattern devices and said display element select circuit is a digit, row and column select logic circuit.

9. The display device of claim 7 further comprising scan converter means for conversion of said information signals into appropriate form for display on a conventional television receiver.

* * * * *